324-77 CROSS REFERENCE SEARCH ROOM

Oct. 24, 1967 S. T. HARMON 3,349,231

ELECTRO-OPTICAL COMPUTER

Filed May 14, 1963 2 Sheets-Sheet 1

INVENTOR
SAMUEL T. HARMON
BY Beale and Jones
ATTORNEYS

Oct. 24, 1967 S. T. HARMON 3,349,231

ELECTRO-OPTICAL COMPUTER

Filed May 14, 1963 2 Sheets-Sheet 2

INVENTOR
SAMUEL T. HARMON

BY Beale and Jones

ATTORNEYS

United States Patent Office 3,349,231
Patented Oct. 24, 1967

3,349,231
ELECTRO-OPTICAL COMPUTER
Samuel T. Harmon, Ann Arbor, Mich., assignor, by mesne assignments, to Ann Arbor Trust Company, trustee, a corporation of Michigan
Filed May 14, 1963, Ser. No. 280,285
21 Claims. (Cl. 235—181)

This invention relates to an electro-optical computer and, more specifically, to apparatus for simultaneously multiplying a time-varying electrical function with a time-varying two-dimensional optical function and integrating the product over a pre-determined time interval.

Computers for handling time-varying phenomena such as electrical, optical, and mechanical functions have many applications in various fields of mathematical analysis and computation, and, in this advancing age of electronics, in the fields of signal detection, data analysis, pattern recognition, speech analysis, and oil field recognition, to name but a few.

In particular, this invention is useful for performing the mathematical computations indicated by equations of the form $$H(x,y)=\int_{t_a}^{t_b} I(x,y,t)\,f(t)\,dt \qquad (1)$$

where $f(t)$ is a given function of the variable $t$, time;
$I(x, y, t)$ is a given function of the variable $t$, and the spacial coordinates $x$ and $y$; and
$t_b$ and $t_a$ are the upper and lower limits of integration.

In computations defined by this integral, $H(x, y)$ is generally known as the integral transform of $f(t)$ with respect to the weighting function $I(x, y, t)$. The computation of various integral transforms is of great importance in a large number of mathematical problems. Examples are: the expansion of functions in series of orthogonal functions; the Fourier analysis of signals; the computation of convolution and superposition integrals; solutions of integral equations and boundary value problems; and the computation of autocorrelation and cross-correlation functions. The solution of each of these problems is well known to be a special case of the computation of the integral transform, depending upon the specific form of the assumed weighting function, $I(x, y, t)$ and the limits of integration. (Reference: Korn & Korn Electronic Analog Computers, page 151; McGraw-Hill, 1956).

Some applications of this type are sufficiently important to warrant the design of special-purpose integral-transform computers. These special-purpose computers are mainly characterized by the specific form of the weighting functions, $I(x, y, t)$, required for given mathematical problems and the means for generating two-dimensional optical analogs of these functions. In each case, however, once these functions are generated, the multiplication of the function generated by an arbitrary function of time $f(t)$ and the integration of the resulting product can be performed by the apparatus of this invention.

For example, consider the computation of the correlation function. Correlation has long been recognized as a convenient mathematical tool for the analysis of phenomena which can be described only in statistical terms.

Autocorrelation is used for analysis of relationships within a given process, yielding useful statistical properties of the process.

Cross-correlation, the analysis of relationships between two or more processes, indicates the extent to which such processes are related or possess similar characteristics.

A correlation computer is defined as a device capable of calculating the following quantity or its equivalent:

$$R(\alpha)=\mathrm{Lim}\,\frac{1}{T}\int_0^T f(t)g(t-\alpha)\,dt \qquad (2)$$

where $f(t)$ and $g(t)$ are two functions of time $t$, and $g(t-\alpha)$ is delayed by an amount, $\alpha$. When the quantities $f(t)$ and $g(t)$ are the same, the result $R(\alpha)$ is defined as the auto-correlation function; otherwise $R(\alpha)$ is the cross-correlation function.

Thus the correlation function defined by Equation 2 is a special case of the integral transform of Equation 1 in which $I(x, y, t)$ is replaced by $g(t-\alpha)$.

When the apparatus of this invention is used in combination with a means for delaying the time-varying electrical function, it is particularly useful as a means of simultaneously obtaining the cross-correlation function of the time-varying electrical function with the time-varying two-dimensional optical function. Further, when the optical functions are generated by an electrical-to-optical conversion system, the computer apparatus, according to this invention, can be used for producing both the cross-correlation function of two time-varying electrical functions and the auto-correlation function of a single time-varying electrical function.

An object of this invention is, therefore, to provide an apparatus suitable for evaluating two-dimensional integral transforms by computing the integral of the product of a time-varying, two-dimensional optical function and a time-varying electrical function.

It is a further object of this invention to provide a fast operating optical-electrical computer in which the optical portion has an extremely large number of input channels.

It is a further object of this invention to provide an apparatus for rapidly computing the cross-correlation and autocorrelation functions of two time-varying electrical functions and a single time-varying electrical function, respectively.

A further object is to provide a method for simultaneously evaluating two-dimensional integral transforms by computing the integral of the product of a time-varying two-dimensional optical function and a time-varying electrical function.

Other objects and many of the advantages of this invention in the computer art will be apparent from the following detailed description taken in connection with the accompanying drawing in which.

Figure 1:
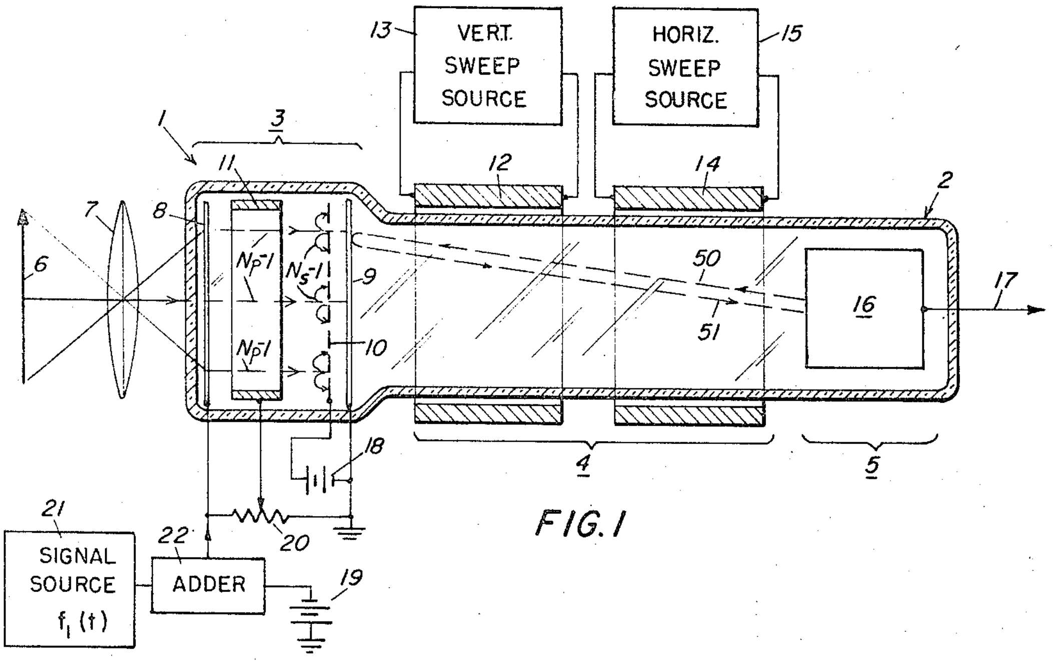
FIG. 1 is a schematic diagram of the basic apparatus for the electro-optical computer according to this invention.

Referring to FIG. 1 of the drawing there is shown the basic electro-optical computer of the invention, designated generally by the numeral 1. The computer elements are enclosed in a tube 2 which has an image section 3, scanning section 4, and electron gun and multiplier section 5. The image section 3, upon which a two-dimensional image 6 is focused by lens system 7, is the part of tube 2 which performs the computation according to this invention.

Image section 3 has a photocathode 8, a target 9 spaced in parallel relationship with a target mesh 10, and an accelerator grid 11 located therebetween. Photocathode 8 is mounted on the inner surface of tube 2 and is made of a semi-transparent material which has a plurality of resolution cells. These cells, when biased by a high negative potential, will emit electrons in direct proportion to the intensity of the light energy striking each cell, as is well known in the art. Target 9 is made of a thin insulator material such as glass which will accept substantially all of the electrons emitted from photocathode 8 and emit secondary electrons in response to bombardment by the electrons from photocathode 8. Target mesh 10 is a fine mesh screen which is very close to, but spaced from the target 9 on the photocathode side and is capable, when biased positively, to pick up secondary electrons emitted from target 9. Components which will exhibit these properties are known in the image tube art, as, for example, in the image orthicon tube.

Scanning section 4 has a vertical deflection coil 12 which is supplied by a conventional vertical sweep source 13 and a horizontal deflection coil 14 which is supplied by a conventional horizontal sweep source 15.

The electron gun and multiplier section 5 has a conventional electron gun and multiplier, shown generally by block diagram 16, and an output lead 17 from which a signal representing the computation appears. The scanning section 4 and electron gun and multiplier section 5 have been illustrated to facilitate a complete understanding of the invention, and any well known type of scanner could be used which would scan the charge accumulated on target 9. This scanning is effected by the emission of a scanning beam 50 and a return beam 51, the beams being controlled by scanning section 4 as is well known in the image tube art.

A bias supply 19 represented by a battery is connected through adder 22 to photocathode 8 and thus is connected between target 9 and photocathode 8 since target 9 is connected to ground.

A signal source 21 is provided to produce a time-varying electrical function $f_1(t)$, which is supplied to the input of adder 22. Signal source 21 can be any conventional type of electrical supply which will produce a time-varying electrical signal, while adder 22 can be any device the output of which is the sum of two inputs. A suitable device for adder 22 would be a transformer or an operational amplifier. The output of adder 22 will be designated $V_T$. In this case the signal $f_1(t)$ is added to the bias supply 19 and the sum $V_T$ applied to photocathode 8 and to a potentiometer 20 which is connected between the output of adder 22 and ground. The target 9 is connected to the grounded end of the potentiometer. A tap off the potentiometer is connected to accelerator grid 11. A bias supply 18 is connected to target mesh 10 to bias this element positively with respect to target 9.

The computer operation can be explained referring to image section 3 of FIG. 1. The two-dimensional image 6 is focused on photocathode 8 by lens system 7, forming an electron image comprising a plurality of primary electrons. These electrons herein referred to as electrons $N_p$, are emitted in direct proportion to the light energy striking each cell of photocathode 8 and are directed toward target 9 in parallel paths at right angles to photocathode 8. The paths taken by electron image primary electrons $N_p$ are indicated on FIG. 1 as $N_p$–1. The electron image so formed is then electrically accelerated by the voltage difference appearing between the photocathode 8 and the target 9 which difference is generated by the application of voltage $V_T$ to photocathode 8. The accelerated electron image is focused on target 9. A portion of $V_T$ is tapped off potentiometer 20 and applied to accelerator grid 11 to focus on target 9 the electron image primary electrons $N_p$ emitted from photocathode 8.

When the electron image primary electrons $N_p$ strike target 9, secondary electrons $N_s$ are emitted and are collected by adjacent target mesh 10 which is biased by a small positive potential from bias supply 18. The path taken by secondary electrons $N_s$ is designated on FIG. 1 as $N_s$–1.

As a result of the bombardment of primary electrons $N_p$ and the emissions of secondary electrons $N_s$, the target accumulates a pattern of positive charges corresponding to the intensity of the electron pattern produced from the image 6 and to the kinetic energy of the electron image when it strikes the target 9.

By properly selecting the amount of bias from supply 19 it has been found that the charge pattern on a given elemental area of the target will be proportional to the integral of the product of the signal voltage $f_1(t)$ and the light intensity reflected from the two-dimensional optical image 6. This light pattern, designated $I(x,y,t)$ and referred to as the two-dimensional time-varying optical function, is focused on the corresponding area of the photocathode for a particular time interval.

Figure 2:
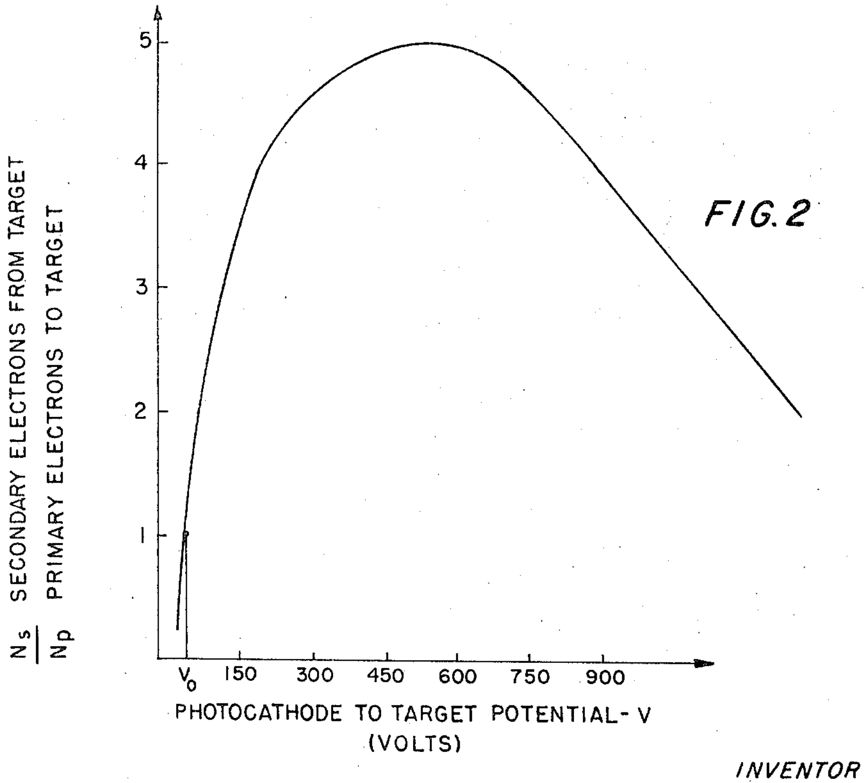
FIG. 2 is a curve showing the relationship between the ratio of electrons leaving and arriving at the surface of the electron target plotted versus the photocathode to target voltage.

Referring to FIG. 2 there is shown a plot of the ratio of the secondary electrons emitted from the target $N_s$ to the primary electrons bombarding the target $N_p$ plotted along the ordinate, and the photocathode to target D-C potential V plotted along the abscissa. In plotting the curve according to FIG. 2, V is a direct current voltage applied between the photocathode 8 and target 9 with the photocathode connected to the negative terminal of the power supply 19 by way of adder 22 to bias photocathode 8 negatively, and with target 9 connected to a positive ground. The curve shows that where V is approximately 500 volts the maximum secondary emission will occur.

However, if the photocathode to target voltage V is operated at a potential where the ratio of $N_s$ to $N_p$ is unity; that is, the number of electrons emitted $N_s$ are equal to the number of electrons arriving $N_p$, it has been found that a simultaneous computation of multiplication and integration results. This critical potential where the ratio $N_s/N_p$ is unity is defined and illustrated in FIG. 2 as the crossover potential $V_o$.

It is also apparent from the curve in FIG. 2 that from the maximum ratio the decline occurs slowly as the voltage increases, the decline to where unity secondary emission ratio will again occur, i.e. $N_s/N_p=1$, generally requiring an excess of 2500 volts and for some target material as much as 15,000 volts. Although the curve in FIG. 2 has not been extended to illustrate the second crossover voltage point it is clear that the operation of the computer according to this invention would take place at a second crossover potential at a much higher voltage level.

The actual computation can be verified by the following mathematical analysis:

Referring to FIG. 2 it can be seen that at the point marked $V_0$ the curve is nearly linear, so it can be expanded in a truncated Taylor series to get:

$$\frac{N_s}{N_p}=F(V)=F(V_o)+\frac{dF}{dV}[V_T-V_o]=1+\frac{dF}{dV}[V_T-V_o] \tag{3}$$

where:

$N_s/N_p$ is defined above

F(V) refers to the function of the voltage between the photocathode 8 and target 9 defined by FIG. 2

$F(V)_o$ is the same function evaluated at the crossover potential defined above The two dimensional optical function $I(x,y,t)$ represents the intensity of light reflected from image 6. When bias supply 19 is set at $V_o$ the potential designated $V_T$ between photocathode and target is.

$$V_T=V_o+f_1(t) \tag{4}$$

This summation of the two voltages occurs in the adder 22 as previously explained.

Each element of the optical scene is focused on a resolution cell of photocathode 8 so that the number of primary electrons per unit time is proportional to the optical intensity reflected from image 6.

$$N_p(x,y,t)=kI(x,y,t) \tag{5}$$

Where $k$ is a constant of proportionality.

Since the target 9 has insulator properties it will accept substantially all of the primary electrons $N_p$ which strike it and therefore the charge Q which accumulates on target 9 will be:

$$Q(x,y)=e\int_0^T [N_p(x,y,t)-N_s(x,y,t)]dt \qquad (6)$$

where:

$e$ is the charge on an electron equal to $1.6\times10^{19}$ coulomb
$T$=the integration interval From Equation 3

$$N_s=N_p+\frac{dF}{dV}N_p[f_1(t)-V_o] \qquad (7)$$

or using 4 and 5

$$N_s=N_p+K\frac{dF}{dV}I(x,y,t)f_1(t) \qquad (8)$$

so $$Q(x,y)=ek\frac{dF}{dV}\int_0^T I(x,y,t)f_1(t)\,dt \qquad (9)$$

which is proportional to the integral of the product of the electrical function $f_1(t)$ and the optical function $I(x,y,t)$, that is:

$$Q(x,y)\propto\frac{1}{T}\int_0^T I(x,y,t)f_1(t)dt \qquad (10)$$

Thus, it is apparent that for any time interval T the integral of the product of the electrical signal and the optical signal falling on photocathode 8 can be read off of target 9. The optical signal may fall on a single resolution cell or a large number of resolution cells, depending on the size of image 6. The value of the integral can be read off of target 9 by a scanner section 4 and electron gun and multiplier section 5 to produce the computed signal on output lead 17. Because photocathode 8 has a large number of resolution cells which will convert light intensity into corresponding electron energy it is apparent that the number of input channels into the optical function receiving portion of this invention is very large.

Figure 3:
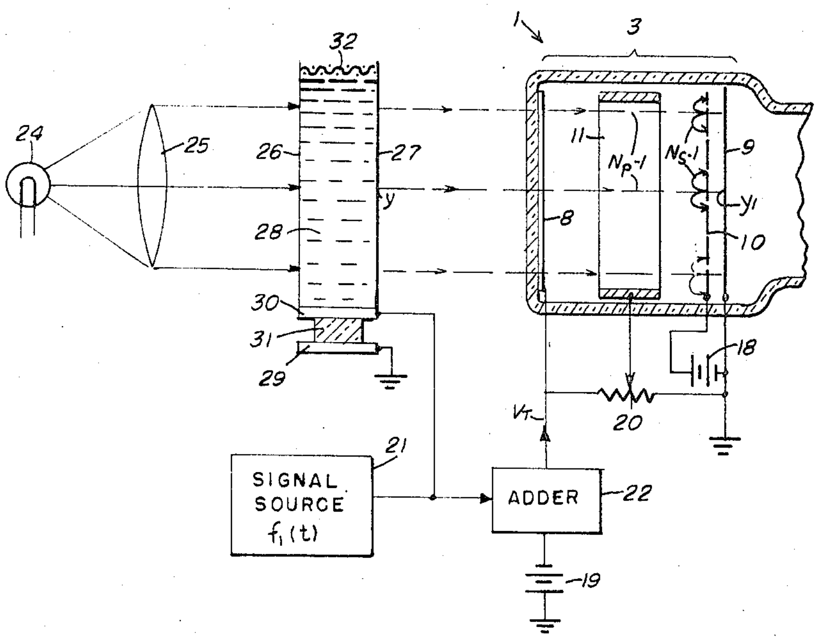
FIG. 3 is a modification of the invention which will produce an auto-correlation function of a time-varying electrical function utilizing a supersonic light valve.

Referring to FIG. 3, there is shown a modification of the invention for producing the auto-correlation function of a time varying electrical function produced by a single source 21 designated $f_1(t)$. In this embodiment there is employed a supersonic light valve of the type disclosed in U.S. Patent No. 2,287,587 to G. W. Willard. This supersonic light valve 26 is comprised of a container 27 within which is a fluid 28. At one end of the valve is an outer electrode 29 and an inner electrode 30 with a quartz crystal element 31 interposed between electrodes 29, 30. A light source 24, as, for example, a D-C excited filament type bulb, emits a constant light beam which is directed by a lens 25 in parallel paths at right angles to the supersonic light valve 26.

In this embodiment the signal $f_1(t)$ produced by source 21 is applied directly to adder 22 and to electrode 30, which is the input of supersonic light valve 26.

The function of supersonic light valve 26 is to interpose a time delay into the electrical function $f_1(t)$ and to produce an optical function $I(x,y,t)$ proportional to the time delayed electrical function.

In operation, the signal $f_1(t)$ from source 21 is applied across the electrodes 29 and 30 which causes vibrations in crystal 31. These vibrations are imparted to fluid 28 causing waves to be set up in the fluid, which waves move away from electrode 30 and are absorbed by layers of wire mesh 32. The light produced by source 24 and directed by lens system 35 is modulated in intensity as it passes through supersonic light valve 26 by the waves produced by signal source 21.

At any given point "$y$," corresponding to a line taken transversely across the light valve, there will be, at a given time, a density modulation which corresponds to the electrical voltage which existed at some earlier time equal to $y/v$.

$v$=velocity of propagation of the sound wave in a liquid
$y$=a point on valve 26

The steady stream of light energy coming in from the left side of supersonic light valve 26 from source 24 and directed by lens system 25 is modulated according to the density modulation of the liquid. This modulated optical function designated $I(x,y,t)$ is then emitted from the right side of the supersonic light valve 26 and falls upon photocathode 8 where it is converted to an electrical image which is accelerated to and found on target 9 with respect to the same manner described in FIG. 1.

The charge accumulated at any point designated $y'$ on the target 9 corresponding to the point $y$ on the valve is proportional to the auto-correlation function of signal $f_1(t)$ for a delay equal to $y/v$.

$I(x,y,t)$ is proportional to $f_1(t-y/v)$ because of the operation of the supersonic valve as previously explained.

When $f_1(t-y/v)$ is substituted in Equation 5 for $I(x,y,t)$ and the same mathematical steps performed as in Equations 6–10 it is apparent that the charge on target 9 will be $$Q(x,y)\propto\frac{1}{T}\int_0^T f_1(t)f_1(t-y/v)dt \qquad (11)$$

which shows the charge to be proportional to the auto-correlation function of signal source $f_1(t)$.

Figure 4:
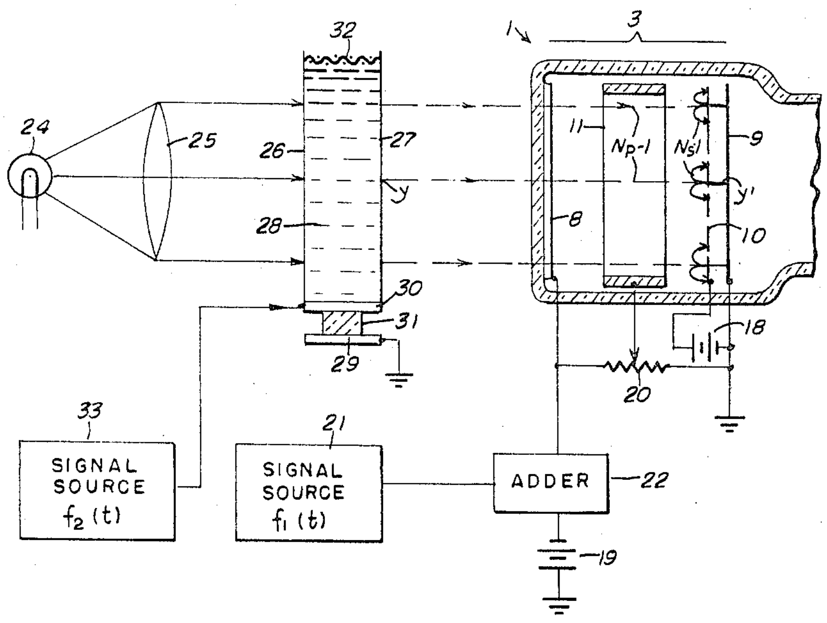
FIG. 4 is a further modification of the invention for producing a cross-correlation function of two different time-varying electrical functions using a supersonic light valve.

Referring to FIG. 4 there is shown a further embodiment wherein a supersonic light valve 26 similar to that in FIG. 3 is used as an electrical to optical conversion system and is supplied by a separate signal source 33 producing signal $f_2(t)$. Signal $f_2(t)$ can be any arbitrary time varying electrical signal different from signal $f_1(t)$. Again, as explained with reference to FIG. 3 $f_2(t)$ will be delayed by the amount $y/v$ to produce $f_2(t-y/v)$ at the output of the supersonic light valve 26 and will be proportional to $I(x,y,t)$.

Again by substituting $f_1(t-y/v)$ in Equation 5 for $I(x,y,t)$ it is apparent that the charge on target 9 is:

$$Q(x,y)\propto\frac{1}{T}\int_0^T f_1(t)f_2(t-y/v)dt \qquad (12)$$

which is the cross-correlation function of signal sources $f_1(t)$ and $f_2(t)$.

While it is apparent that optical function $I(x,y,t)$ is generated by a supersonic valve in the embodiment of FIGS. 3 and 4 to produce the auto-correlation and cross-correlation functions of electrical signals, many other ways of generating optical functions which would yield to computation according to this invention would be suitable.

Although I have described the invention with a certain degree of particularity, it is understood that the present disclosure has been made only by way of example and that numerous changes in details of construction and the combination and arrangement of parts may be resorted to without departing from the spirit and the scope of the invention as hereinafter claimed.

I claim:

1. A device for performing the mathematical computation indicated by the equation $$H(x,y)=\int_{ta}^{tb}I(x,y,t)f(t)\,dt$$

where $I(x,y,t)$ is an optical function and $f(t)$ an electrical function and $ta$ and $tb$ time limits comprising: means to emit first electrons in proportion to the intensity of said optical function; means to accept said first electrons and emit second electrons in response to bombardment by said first electrons; electrical means to apply said electrical function across said means to emit and said means to accept for accelerating said first electrons, said electrical means further including means to control the ratio of said first electrons to said second electrons so that the charge accumulation on said means to accept represents said mathematical computation.

2. A device according to claim 1 wherein said ratio of said first electrons to said second electrons is substantially unity.

3. A device according to claim 1 wherein said electrical means includes: a bias voltage supply and adder means coupled between said bias supply and said means to emit and said means to accept with said electrical function applied to said adder means.

4. A device for performing the mathematical computation indicated by the equation $$H(x, y)=\int_{ta}^{tb} I(x, y, t)f(t)dt$$

where I($x.\ y,\ t$) is an optical function, $f(t)$ an electrical function and *ta* and *tb* time limits comprising: means to generate said optical function; means to generate said electrical function; means to emit first electrons in response to said optical function; means to accept said first electrons and emit second electrons in response to bombardment by said first electrons; first grid means for accepting said second electrons adjacent said means to accept; second grid means between said means to emit and said means to accept to direct said first electrons; and electrical means to apply said electrical function and a bias voltage across said means to emit and said means to accept whereby to accelerate said first electrons and control the ratio of said first electrons to said second electrons so the charge accumulation on said means to accept represents said mathematical computation.

5. A device according to claim 4 wherein the ratio of said first electrons to said second electrons is substantially unity.

6. A device according to claim 4 wherein said electrical means includes: a D-C voltage supply; adder means coupling said D-C voltage supply across said means to emit and said means to accept; and means for applying said electrical function to said adder means.

7. An electro-optical computing device for simultaneoutly multiplying a time-varying electrical function with a time-varying two-dimensional optical function and integrating the product over a pre-determined time interval comprising: means to emit primary electrons in response to said optical function; means to accept said primary electrons and emit secondary electrons in response to bombardment of said primary electrons; electrical means coupled between said means to emit and said means to accept for accelerating said primary electrons and for controlling the ratio of said primary and said secondary electrons to regulate the charge accumulation on said means to accept and to supply said electrical function; and grid means adjacent said means to accept to receive said secondary electrons.

8. An electro-optical computing device according to claim 7 wherein said means to emit is a photocathode having a large number of resolution cells, each such cell emitting electrons in proportion to the magnitude of said optical function.

9. An electro-optical computing device according to claim 7 wherein said means to accept is a target of thin insulating material which will accept substantially all of the primary electrons striking thereon.

10. An electro-optical computing device according to claim 7 wherein said electrical means includes a source of direct current bias voltage which establishes a voltage across said means to emit and said means to accept such that the number of primary electrons accepted is substantially equal to the number of secondary electrons emitted.

11. An electro-optical computing device according to claim 10 wherein said electrical means includes a signal source to supply said electrical function and an adding means coupled to said signal source and said source of direct current bias voltage to apply the sum of said signal source and said direct current bias voltage to said means to emit.

12. An electro-optical computer for performing computation using a time-varying electrical function and a two-dimensional time-varying optical function comprising; first electrical supply means to produce said electrical function; optical supply means to produce said optical function; emitter means responsive to said optical function to produce primary electrons in response to said optical function; collector means adjacent said emitter means to receive said primary electrons and emit secondary electrons; electrical means to couple said first electrical supply means between said emitter means and said collector means and further to apply a bias voltage between said emitter means and said collector means to fix the ratio of secondary electrons to primary electrons at substantially unity so that the charge accumulation on said collector means represents the computation.

13. An electro-optical computer according to claim 12 wherein said emitter means is a photocathode having a plurality of cells, each cell emitting electrons in accordance with the magnitude of the portion of the optical function corresponding to said cell.

14. An electro-optical computer according to claim 13 wherein said optical supply means includes an image and a lens system to focus said image on said photocathode, whereby the electrons emitted by said photocathode produce a charge accumulation on said collector means which represents the integral of the product of points along said image and said electrical function over a predetermined time interval.

15. An electro-optical computer according to claim 13 wherein said optical supply means includes a second electrical supply means to produce a second time-varying electrical function, conversion means responsive to said second electrical function to produce a time-delayed optical function proportional to said second electrical function, whereby the electrons emitted by said photocathode produce a charge accumulation on said collector means which represents the cross-correlation function of said first electrical function and said second electrical function.

16. An electro-optical computer according to claim 15 wherein said conversion means includes a supersonic light valve having an input means coupled to said second electrical supply means and means for generating a beam of light adjacent said supersonic light valve.

17. An electro-optical computer according to claim 13 wherein said optical supply means includes conversion means responsive to said first electrical function to convert said first electrical function into an optical function proportional to a time delayed version of said first electrical function whereby the electrons emitted by said photocathode produce a charge accumulation on said collector means which represents the auto-correlation function of said first electrical function.

18. An electro-optical computer according to claim 17 wherein said conversion means includes a supersonic light valve having an input means coupled to said first electrical supply means, and means for generating a beam of light adjacent said supersonic light valve.

19. A system for deriving a correlation between a time-varying electrical function and a two-dimensional time-varying optical function comprising: means to generate said electrical function; means to generate said optical function; emitter means responsive to said optical function to produce first electrons; collector means adjacent said emitter means to receive said first electrons and emit second electrons; first grid means between said emitter means and said collector means to control said first electrons; second grid means adjacent said collector means to collect said second electrons; electrical means to apply a constant voltage between said emitter means and said collector means to impart energy to said first electrons and establish the ratio of secondary electrons to primary electrons at substantially unity, said electrical means further including means to receive said electrical function and to apply said electrical function between said emitter means and said collector means.

20. A system for deriving the auto-correlation function of a time-varying electrical function comprising means for supplying said electrical function; means including a supersonic light valve having a fluid therein responsive to said electrical function and means for producing and directing a plurality of light rays through said light valve to produce an optical function proportional to a time-delayed version of said electrical function; and means for simultaneously integrating the product of said electrical function and said optical function over a predetermined time interval, including means to emit primary electrons in response to said optical function, means to collect said primary electrons and emit secondary electrons in response to said primary electrons, electrical means applied between said means to emit and said means to collect for accelerating said primary electrons and for establishing the ratio of said primary electrons to said secondary electrons; and means for scanning said means to collect for deriving said auto-correlation function.

21. A system for deriving the cross-correlation function of a first time-varying electrical function and a second time-varying electrical function comprising: means for supplying said first and said second electrical functions; means including a supersonic light valve having said first electrical function supplied thereto; means for generating and directing a plurality of light rays through said valve to produce a two-dimensional, time-varying optical function proportional to a time-delayed version of said first electrical function; means for simultaneously integrating the product of said optical function and said second electrical function over a predetermined time interval, including means to emit primary electrons in response to said optical function, means to collect said primary electrons and emit secondary electrons in response to said primary electrons, and electrical bias means applied between said means to emit and said means to collect for accelerating said primary electrons and for establishing the ratio of said primary electrons to said secondary electrons; and means for scanning said means to collect for deriving said cross-correlation function.

References Cited

UNITED STATES PATENTS

| | | | |
|---|---|---|---|
| 2,664,243 | 12/1953 | Hurvitz | 235—181 |
| 2,943,315 | 6/1960 | Rosenthal | 235—181 X |
| 3,088,113 | 4/1963 | Rosenthal | 235—181 |

MALCOLM A. MORRISON, *Primary Examiner.*

A. J. SARLI, *Assistant Examiner.*